(12) United States Patent
Gravino et al.

(10) Patent No.: US 9,008,888 B1
(45) Date of Patent: Apr. 14, 2015

(54) COST BASED NAVIGATION

(75) Inventors: Douglas David Gravino, Roswell, GA (US); Michael Lee Poffenberger, Sandy Springs, GA (US)

(73) Assignee: Cox Communications, Inc., Atlanta, GA (US)

( * ) Notice: Subject to any disclaimer, the term of this patent is extended or adjusted under 35 U.S.C. 154(b) by 549 days.

(21) Appl. No.: 13/196,616

(22) Filed: Aug. 2, 2011

(51) Int. Cl.
*G01C 21/00* (2006.01)
*G01C 21/34* (2006.01)

(52) U.S. Cl.
CPC .................................. *G01C 21/3476* (2013.01)

(58) Field of Classification Search
CPC ...... G01C 21/00; G01C 21/005; G01C 21/14; G01C 21/20; G01C 21/34; G01C 21/3453; G01C 21/3484; G01C 21/3476; G01C 21/3492; G05D 1/00; G05D 1/005; G05D 1/004
USPC ......... 701/409, 410, 412, 425, 426, 430, 438, 701/468
See application file for complete search history.

(56) References Cited

U.S. PATENT DOCUMENTS

| 5,948,040 | A  | * | 9/1999  | DeLorme et al. | 701/426 |
| 6,321,158 | B1 | * | 11/2001 | DeLorme et al. | 701/426 |
| 8,494,767 | B2 | * | 7/2013  | Bugnariu       | 701/468 |
| 8,494,770 | B2 | * | 7/2013  | Forutanpour et al. | 701/533 |

* cited by examiner

*Primary Examiner* — Richard Camby
(74) *Attorney, Agent, or Firm* — Merchant & Gould P.C.

(57) ABSTRACT

Determination of a most efficient intermediate destination while traveling toward a primary destination is provided. With respect to its effect on the primary destination, the most efficient intermediate destination such as a fast-food restaurant, gas station, ATM, etc., may be determined. The navigation system may search in a user-defined radius for all intermediate destinations and present the deviation costs associated with each destination thereby allowing the user to choose the most efficient option. The deviation costs may be determined by the navigation system with respect to user preferences for minimizing time, minimizing distance, minimizing fuel consumption, restaurant preferences, and the like, and their impact on the primary destination arrival time.

20 Claims, 8 Drawing Sheets

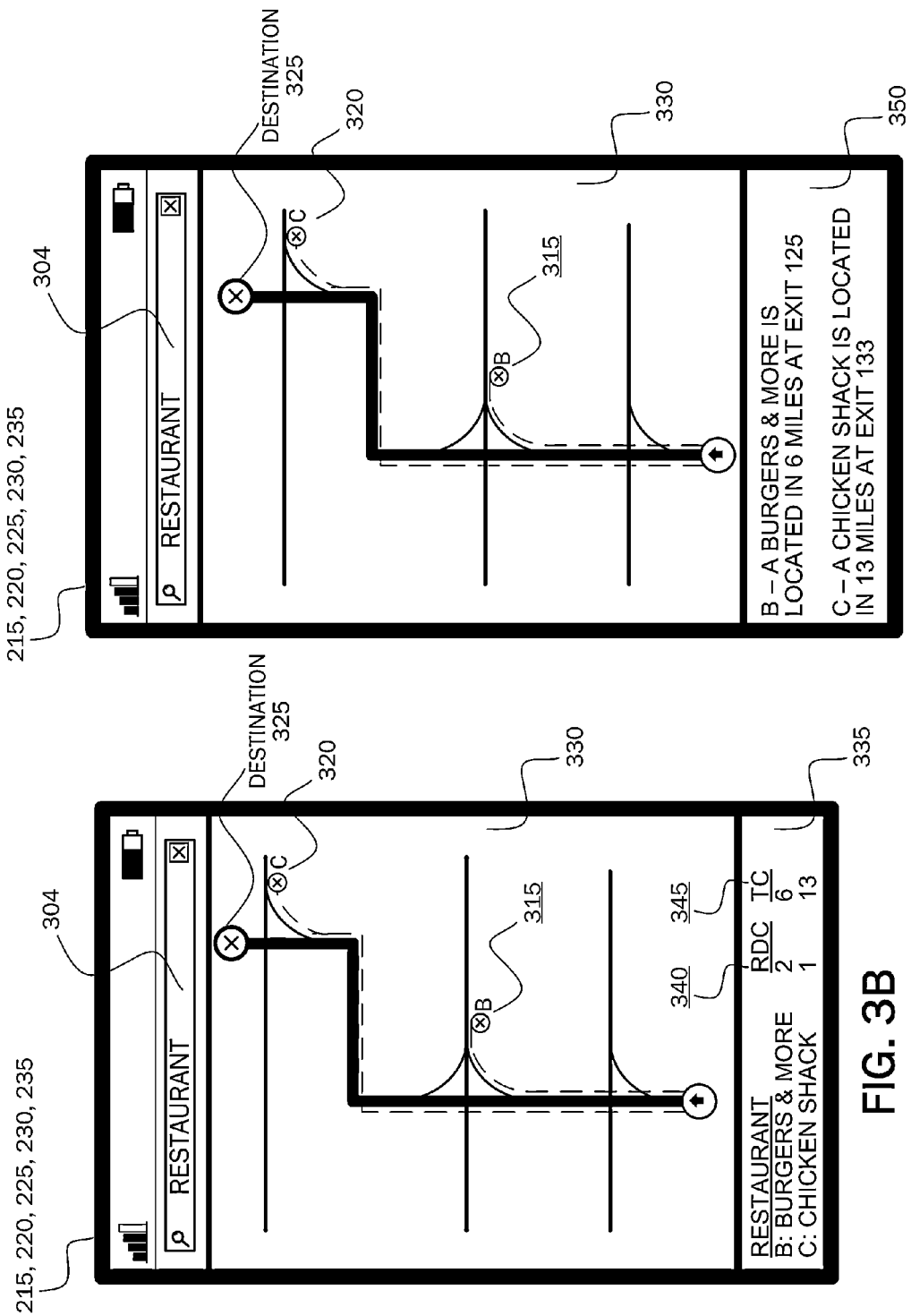

COST BASED NAVIGATION

BACKGROUND

Navigation devices have become popular tools for helping users navigate a route of travel to a specified destination. Oftentimes, a user may utilize a navigation device to aid in navigating to a specified destination, and may also seek one or more intermediate points of interest while traveling toward the specified destination. For example, a user may want to stop to refuel his/her automobile or to eat at a restaurant while en route to a final destination. Some current navigation systems provide users an ability to search and locate points of interest (e.g., restaurants, fuel stations, hotels, automatic teller machines (ATMs), etc.) in a given area. For example, some navigation systems allow users to enter a location into a search field by entering a specific address, a zip code, a name of a city, a name of a business, a type of business, a phrase, etc. A search may produce a list of search results and/or one or more selectable map points displayed on a map interface. Current navigation systems may additionally present a distance and/or travel time to each point of interest.

Some current navigation systems may allow a user to enter one or more points of interest along a specified route to a destination. Such systems may recalculate the distance and travel time to the destination to include the added intermediate point(s) of interest. While current navigation systems offer the above and other features, current systems do not provide for associating user preference data to calculate a route deviation cost associated with one or more intermediate points of interest to allow a user to select an optimal route.

It is with respect to these and other considerations that the present invention has been made.

SUMMARY

Embodiments of the present invention provide deviation cost-based filtering of one or more potential intermediate points of interest along a route to a primary destination. According to embodiments, a search for an intermediate point of interest (e.g., a fuel station, a restaurant, an ATM, etc.) may filter intermediate point of interest search results by user preferences. Filtering may be based on one or more of a user's preferences to stay within a certain distance of an existing route of travel to a primary destination, characteristics of additional travel beyond an exiting route of travel, impact to overall travel time, and/or weighting based on user preferences for a particular brand or type of intermediate point of interest. A route of travel may be adjusted so that total travel distance/time to both the end destination and to intermediate points of interest may be minimized.

Embodiments of the present invention provide users with point of interest search results based on a calculated deviation cost from a route to a primary destination. A cost may be based on various methodologies including, but not limited to, driving distance, travel time based on real-time traffic information, a number of right-hand turns versus left-hand turns along a route, a number of traffic lights along a route, etc. Embodiments may provide a calculation of both a total cost and a route-deviation cost for each potential intermediate point of interest. Intermediate point of interest search results may be filtered based on presets for both total and deviation costs, providing users with a more relevant and efficient travel experience by filtering intermediate point of interest search results according to user preferences.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 3B illustrates a map interface including intermediate points of interest and respective route deviation costs and total costs according to one embodiment.

FIG. 3C illustrates a map interface including intermediate points of interest and a message area including travel information to displayed intermediate points of interest according to another embodiment.

DETAILED DESCRIPTION

As briefly described above, embodiments of the present invention are directed to providing deviation cost-based filtering of one or more potential intermediate points of interest along a route to a primary destination. A preferred routing may be determined by associating a cost with one or more intermediate points of interest, the costs being based on user preference data.

Various navigation-enabled devices and systems may be utilized for presenting navigation options. A navigation system may include a user end-point device capable of displaying navigation and deviation cost information to a user. For example, navigation systems may be built-in or removable navigation systems, mobile phones, smart phones, wireless computers, tablet computers, and the like, or any device equipped with wireless navigation capabilities. Analyzing criteria and calculating/processing deviation costs may be done locally within the local navigation device or system, or remotely over a distributed computer network and database via broadband, Wi-Fi, etc.

Various intermediate destinations such as fuel stations, restaurants, ATM's (Automated Teller Machines), hotels, convenience stores, and the like, may be potential intermediate points of interest while traveling along a route toward a destination. According to embodiments, a user of a navigation system, such as a global positioning system (GPS) navigation device or a GPS-enabled device, may input preference data associated with various factors including, but not limited to, fuel consumption, road class, traffic, a number of traffic lights, a number of right-hand turns, a number of left-hand turns, road construction, restaurant type, hotel class, specific merchants, etc. The input preference data may be utilized to determine a total cost and a route deviation cost associated with each point of interest (POI) along a route. According to a user's preferences, cost penalties, herein referred to as route deviation costs, may be applied to factors associated with a rerouting to a POI. Each factor may have an individual deviation cost associated with it, or a deviation cost may be associated with a combination of factors. According to embodiments, route deviation costs may be weighted differently according to user preference data specified by a user.

Figure 1:
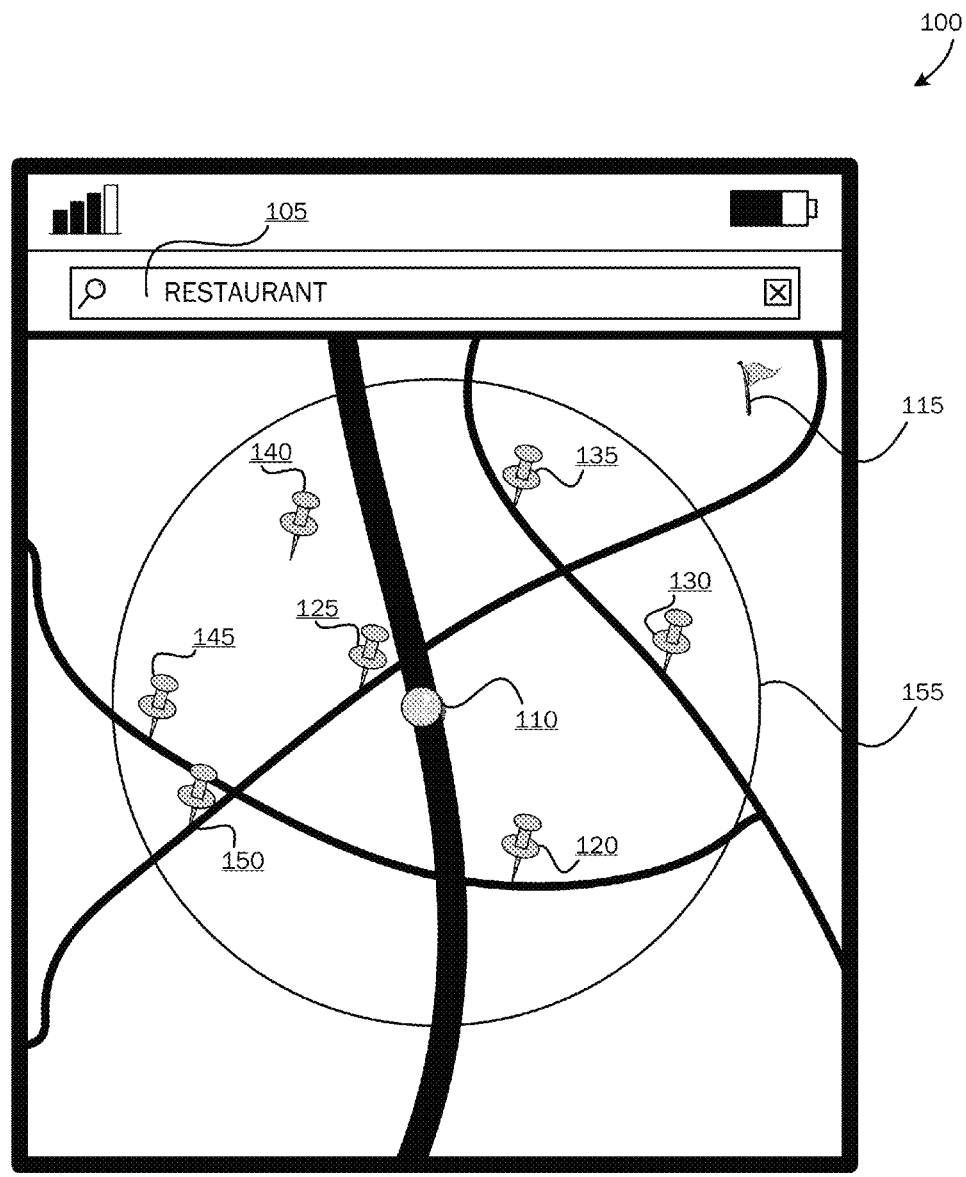
FIG. 1 illustrates an example of a conventional map interface with intermediate points of interest populated on a navigation device display.

As discussed above, current navigation systems may fail to consider user preferences when providing search results for intermediate points of interest. For example, and as shown in FIG. 1, a search for "restaurant" 105 utilizing current systems may provide a user with results 120, 125, 130, 135, 140, 145, 150 within a given radius 155 or within a certain driving time of the user's current location 110. Some current navigation systems may provide detailed information about a POI when a respective map point 120, 125, 130, 135, 145, 150 is selected. Although map points may be displayed because the respective POI meets search criteria (e.g., category, within search radius, etc.), options presented to a user may not be optimal to the user based on various preferences the user may have. One or more points of interest presented to a user may not be deemed as an acceptable choice to the user if, for example, travel to a particular POI adds a certain amount of additional travel distance, increases an overall travel time, entails routing the user through a congested area, or if the particular POI is not a desired type or brand of business (e.g., fast food instead of sit-down restaurant, a brand of bank with which the user does not have an account, etc.).

Embodiments of the present invention provide filtered POI search results based on a calculated total cost and a calculated route-deviation cost for each potential intermediate POI. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 2:
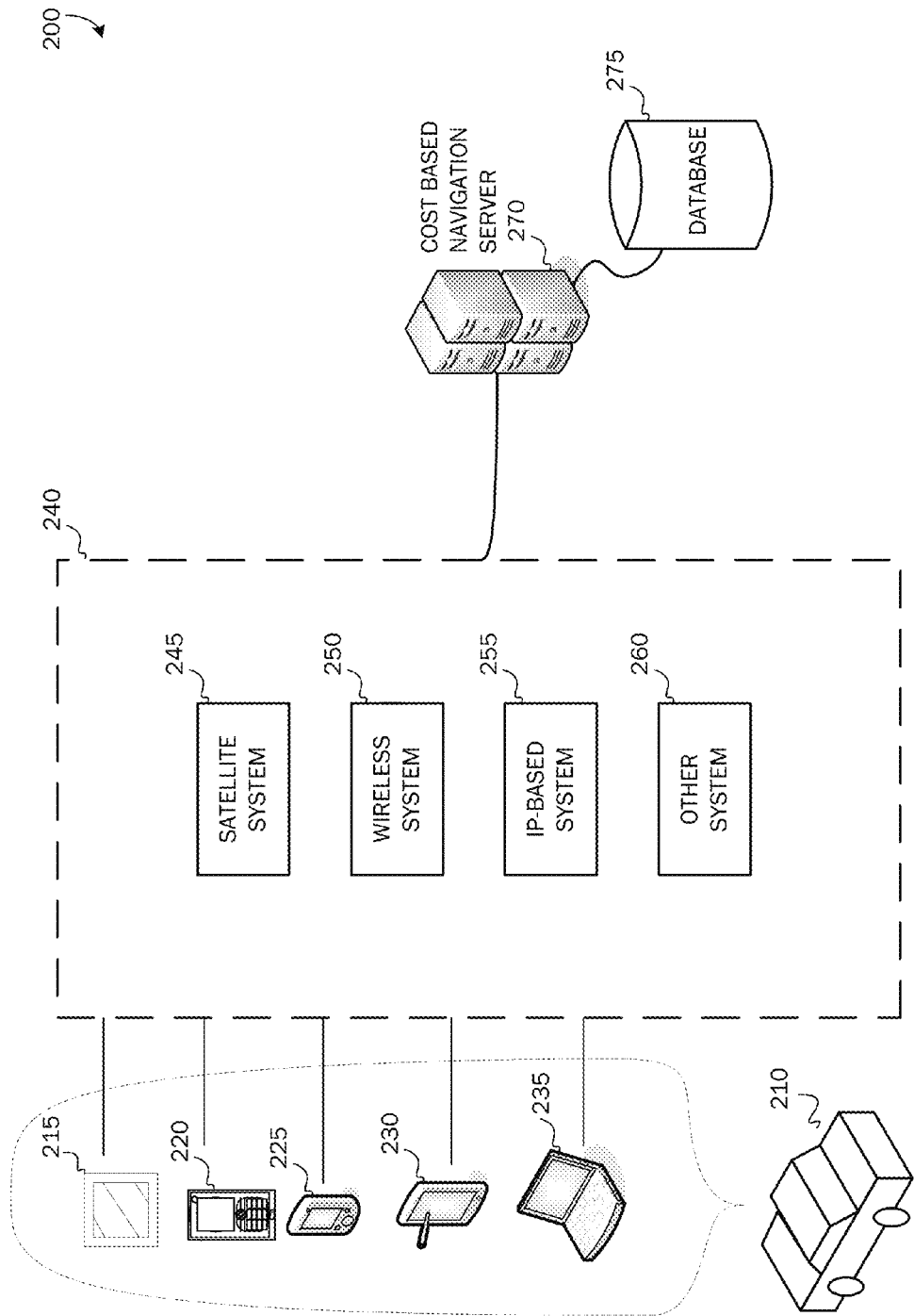
FIG. 2 illustrates a simplified block diagram of a communication network architecture that serves as an exemplary operating environment for embodiments of the present invention.

Referring now to FIG. 2, a simplified block diagram of a communication network architecture that serves as an exemplary operating environment for the present invention is illustrated. According to embodiments of the present invention, a variety of navigation-enabled devices and systems may be utilized with a cost based navigation system.

Various navigation-enabled devices may be utilized for navigation purposes by pedestrians, users of non-automated vehicles, and users of automated vehicles, such as automobile 210. The term "navigation system device" will herein be used to describe a device operable to provide location, routing, and POI information. Some navigation system device examples include, but are not limited to, a Global Positioning System (GPS) receiver 215, a mobile communication device 220, a Personal Digital Assistant (PDA) 225, a tablet computer 230, a personal computer 235, etc. A navigation-enabled device 215, 220, 225, 230, 235 may be equipped with a GPS system, wherein the GPS system is operative to provide routing information and to determine a user's 205 location. Once a user's location has been determined, the GPS system may calculate other information, such as speed, bearing, track trip distance, distance to destination, sunrise and sunset time and more. When coupled with a navigation application, a navigation system device can pinpoint the device's location, give directions to a provided destination, and may provide information about nearby points of interest.

According to embodiments, if a device does not comprise a GPS system, network-based location technologies, accelerometer mechanisms, or wireless positioning systems, for example, WIFI-based systems, may be utilized to provide location information. According to one embodiment, a location of a device may be determined via a reference network comprised of known locations of wireless access points (i.e., wireless positioning system or WPS). Wireless access points and their locations may be used by a mobile computing device 220 to triangulate a user's position. WPS may be combined with cellular tower triangulation and GPS to provide location data. A navigation system device may utilize other location determining means, such as client software that may compute the device's location by cell identification and signal strengths of home and neighboring cells. Mobile computing device 220 may utilize a service provider's network infrastructure to identify a location of the device. A hybrid positioning system may also be utilized for location determination, wherein the hybrid system may use a combination of network-based and device-based technologies to compute a location.

A navigation system device may be utilized to communicate with one or more remote applications or other endpoint devices via a communications network 240. As should be appreciated, the numerous endpoint devices illustrated in FIG. 2 may be utilized to send and/or receive communications in various operating environments according to various types of transmissions, including navigation transmissions.

The network 240 is illustrative of one or more data delivery systems through which the various endpoint devices/systems may operate. For example, the satellite system 245 may be utilized to send data transmissions via high-frequency, low-powered radio signals. The wireless system 250 may be utilized for wireless voice, text and data transmissions. The IP-based system 255 may be utilized for any of a variety of Internet protocol-based services such as voice and data transmissions. Other systems 260 are illustrative of any number of other systems that may be utilized for providing communications between various endpoint devices with other endpoint devices, software applications and data repositories. A single combined system may be provided by a given service provider for providing multiple types of the aforementioned communications services, including navigation systems.

Referring still to FIG. 2, a cost based navigation server 270 and associated database 275 may serve as a central computerized system for receiving, processing, calculating, mapping, routing, and data storage according to the embodiments of this invention. The cost based navigation server 270 is illustrative of any suitable computing system (e.g., server computer), capable of sending, receiving, processing, mapping, verifying and storing data according to embodiments of the present invention. The cost based navigation server 270 may be associated with any one or combination of the communications systems illustrated in the network 240 for maintaining and processing navigation information, including but not limited to, mapping, routing, locating, as well as, all necessary cost based navigation functionality. The associated database 275 may be operative for storing user preference data, navigation, and POI information. According to embodiments, the cost based navigation server 270 and associated database 275 may be utilized for various navigation technologies and may not be limited to a single navigation company but may be multiple navigation companies. As should be appreciated, these are but a few examples of the many ways cost based navigation may be implemented to an end user based on user preference data and minimizing criteria.

Figure 3A:
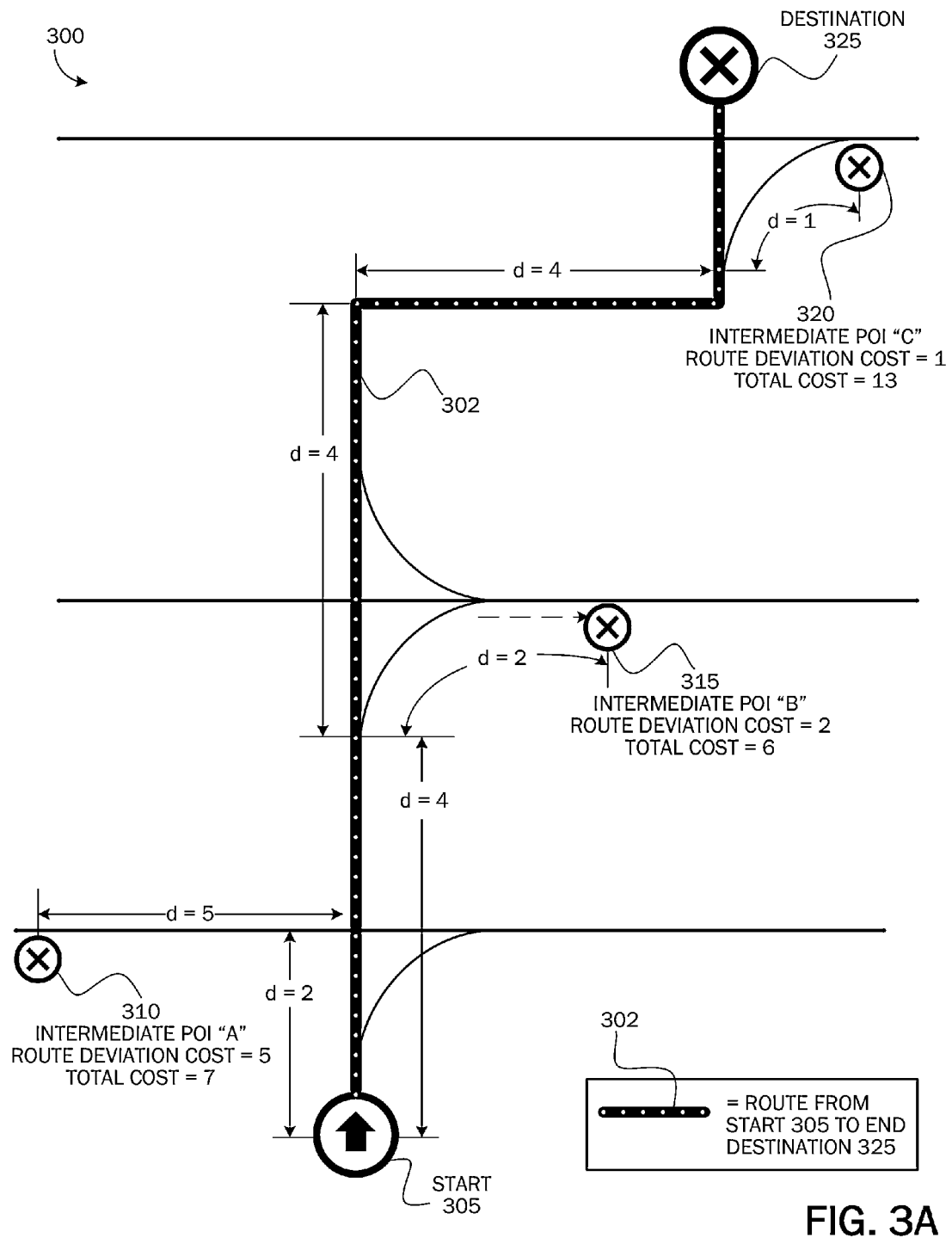
FIG. 3A illustrates a simplified diagram showing a route with various intermediate points of interest including a route deviation cost and total cost for each point of interest.

As described briefly above, embodiments of the present invention may provide a user with a more relevant and efficient travel experience by filtering intermediate POI search results based on a calculated total cost and a calculated route deviation cost for each potential intermediate POI according to the user's preferences. Referring now to FIG. 3A, a diagram 300 is illustrated showing a route 302 from a starting point 305 to a primary destination 325. Also shown are various intermediate POIs 310, 315, 320 and a route deviation cost and total cost associated with each intermediate POI. Consider, for example, a user searches for a restaurant while on a long-distance interstate highway trip. Consider also, that the user has set a deviation cost filter to "2 minutes," which means that any restaurant more than two minutes from the current route will not be shown.

According to one embodiment, a route deviation cost may be derived from a distance or travel time from an established route 302 to an intermediate POI 310, 315, 320. For example, still referring to FIG. 3A, the distance from the established route 302 to intermediate POI "A" 310 may be 5. As should be appreciated, 5 may be an actual number of miles from the established route 302, or may be a calculated score factoring in the distance from the established route 302 to the intermediate POI "A" 310. According to embodiments, a route deviation cost may be a calculated score that factors in other variables such as, but not limited to, a number of right-hand or left-hand turns, type or brand preference of a POI, road class types, urban vs. rural routes, a number of stops, etc. depending on a user's preferences. As shown on FIG. 3A, a route deviation cost to intermediate POI "B" 315 is 2, and a route deviation cost to intermediate POI "C" 320 is 1.

According to another embodiment, a total cost may be considered for each combination of intermediate POI and end destination 325. A total cost may be derived from taking the distance from a starting point 305 or current location to the deviation point (i.e., the point at which traveling to an intermediate POI 310, 315, 320 would require deviating from the existing route 302), and adding that distance to a derived route deviation cost. For example, and still referring to FIG. 3A, a total cost for deviating from the existing route 302 to intermediate POI "A" 310 would be 2 (distance from the start 305 to the exit to intermediate POI "A") plus 5 (route deviation cost previously calculated), equaling a total cost of 7. Using the same calculation, the total cost to intermediate POI "B" is 6, and the total cost to intermediate POI "C" is 13.

According to the present example, the user has set an example deviation cost filter to 2 minutes. Thus, intermediate POI "A" may not be displayed to the user, since the route deviation cost is greater than 2. As should be appreciated, a route deviation cost and a total cost may be calculated in alternative ways. For example, other variables (e.g., a number of right-hand or left-hand turns, type or brand preference, road class type, urban vs. rural route, a number of stops, etc.) may be considered and may be factored into the calculations.

As shown in FIGS. 3B and 3C, filtered intermediate POI search results may be displayed to a user in a variety of ways. For example, according to one embodiment and as illustrated in FIG. 3B, a map interface 330 displaying intermediate POI search results 315, 320 as map points may be displayed. A listing 335 of intermediate POI search results may or may not be provided. The listing 335 may be provided alone or in combination with a map interface 330. The listing 335 may include a route deviation cost 340 and a total cost 345 for each intermediate POI 315, 320. According to another embodiment, upon selection of a displayed intermediate POI, a route deviation cost and/or a total cost may be provided.

Another method, and as illustrated in FIG. 3C, may include displaying a map interface 330 displaying intermediate POI search results 315, 320 as map points, and a message area 350 displaying a short description of each intermediate POI search result 315, 320 and a distance away to each POI. For example, and as illustrated, a message such as, "A BURGERS & MORE (POI "B" 315) IS LOCATED IN 6 MILES AT EXIT 125."

Figure 3D:
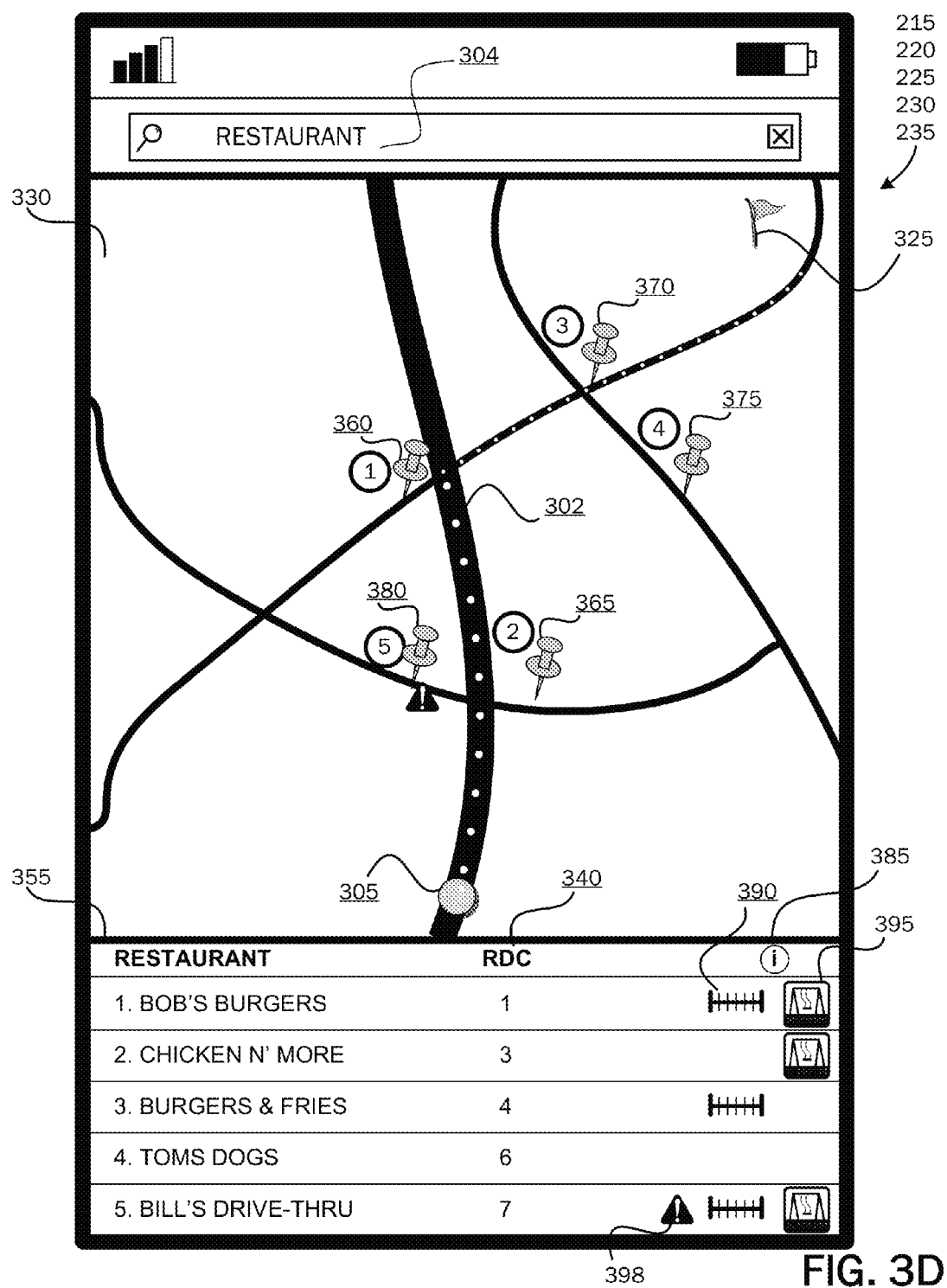
FIG. 3D illustrates a map interface including intermediate points of interest and an information area that may be provided for listing features that may have contributed to a route deviation cost calculation according to another embodiment.

Another method, and as illustrated in FIG. 3D, may include providing a route from a starting point 305 or current location to a primary destination 325 displayed on a map interface 330. When a user searches for an intermediate POI, a selection of POI search results 360, 365, 370, 375, 380 may be plotted on the map interface 330. As illustrated, a route deviation cost 340 associated with each intermediate POI may also be displayed. In this example, other features of deviating to a potential POI are factored into each route deviation cost. In this example, distance to an intermediate POI off from the existing route 302 and a presence of a playground at an intermediate POI is factored in. As illustrated in FIG. 3D, an information area 385 may be provided for listing features that may have contributed to a route deviation cost calculation. Consider, for example, a user specifies that a restaurant with a play area is preferable. The user may also specify that minimizing the distance from an existing route 302 to an intermediate POI is desirable. Additionally, the user may specify that travel through a road construction zone is highly undesirable. As illustrated, potential intermediate POI 1 "Bob's Burgers" 360 has a route deviation cost of 1. As shown in the information area 385, Bob's Burgers has a minimal deviation distance 390 and features a playground 395. Still referring to the example in FIG. 3D, potential intermediate POI 5 "Bill's Drive-Thru" 380 has a route deviation cost of 7. Although Bill's Drive-Thru 380 has a minimal deviation distance 390 and a playground 395, the route deviation cost is the highest of the five displayed POIs 360, 365, 370, 375, 380, as a result of a determination that there is road construction 398 along the route from the established route 302 to Bill's Drive-Thru 380.

Figure 4:
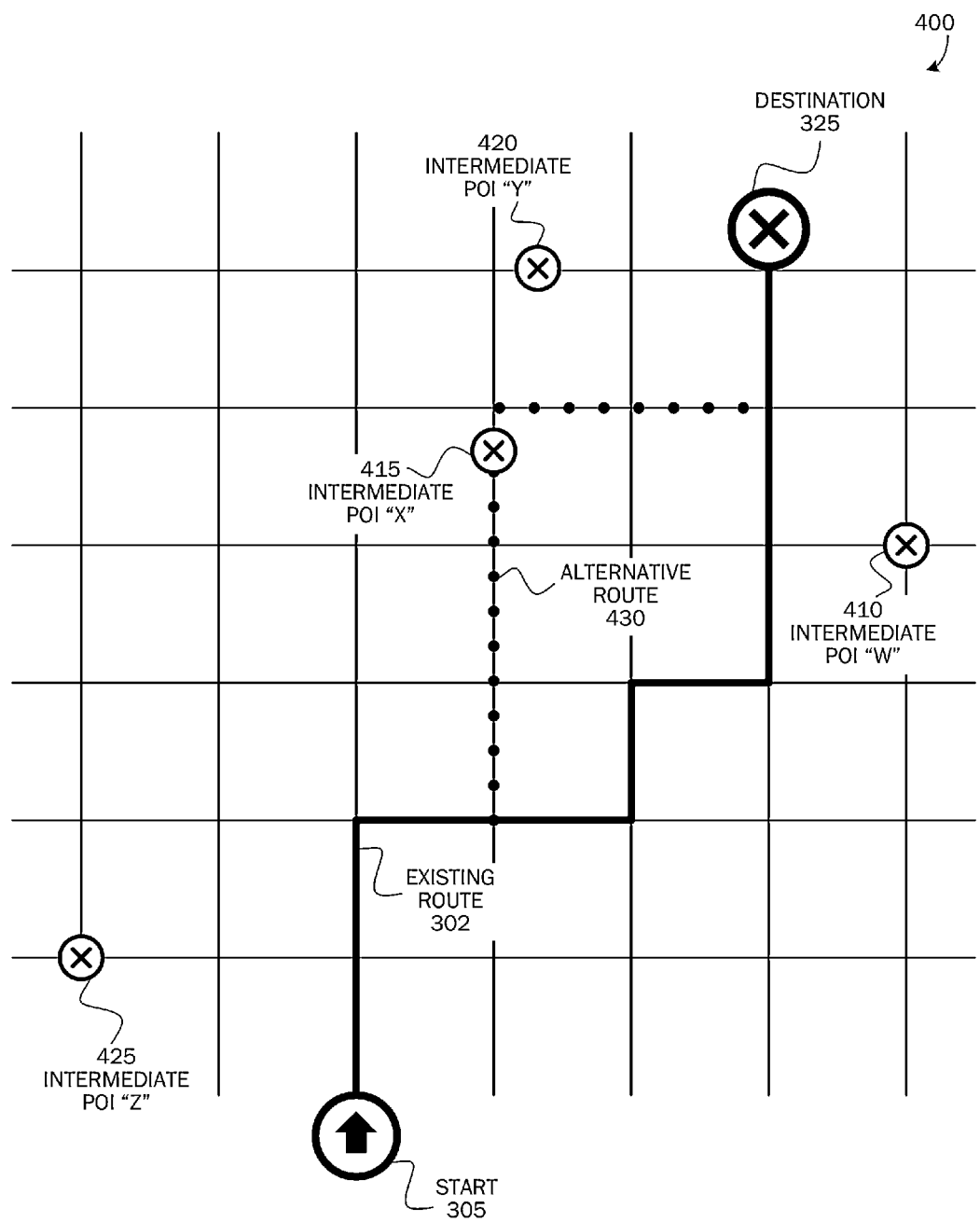
FIG. 4 illustrates a map interface including alternative routes to a primary destination including points of interest according to an embodiment.

According to another embodiment, a route 302 from a starting point 305 or current location to a primary destination 325 may be adjusted or altered to minimize a total cost 345 to travel to both the end destination and an intermediate POI. For example and referring now to FIG. 4, consider a route through an urban area. As illustrated, an intermediate POI "W" 410 has a least deviation (based on travel distance) from the existing route of travel 302 to the destination 325. By shifting the route of travel to an alternate route 430, the travel distance to the end destination 325 remains the same; however, now intermediate POI "X" 415 is along the route 430 with no deviation required. Thus, the total cost of travel 345 to intermediate POI "X" 415 with the alternate routing 430 is less than the total cost of travel to intermediate POI "W" 410 with the original route 302.

According to another embodiment, a deviation cost associated with a combination of intermediate POIs may be provided. For example, a user may wish to deviate from a route 302 to stop for both food and gas. Search data for both types of intermediate POIs may be input into the navigation system, wherein one or more deviation routes including both types of intermediate POIs may be provided based on a calculated combined route deviation cost and/or a calculated total cost for each combined intermediate POI deviation route.

Figure 5:
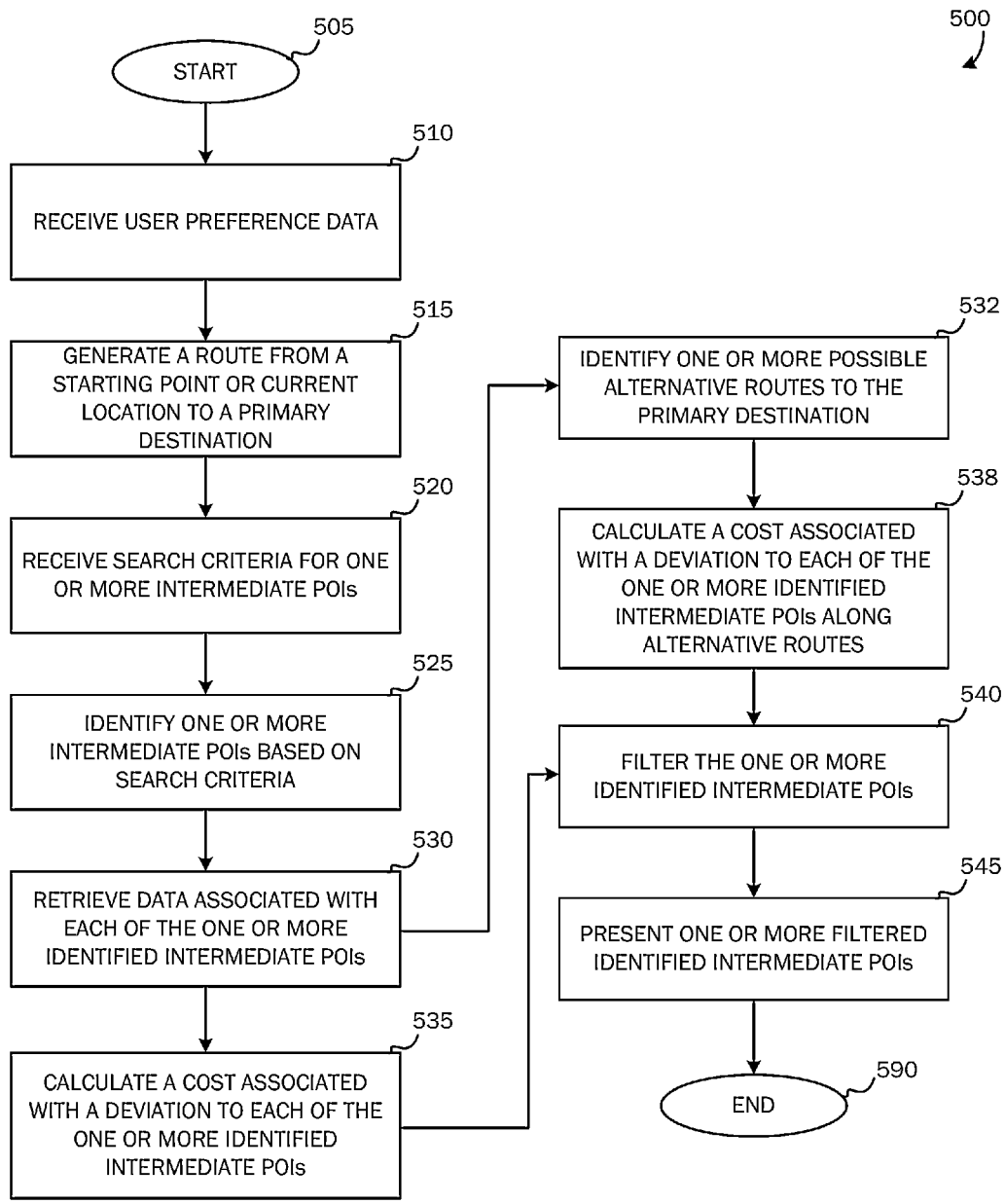
FIG. 5 illustrates a flow chart of an illustrative routine for providing deviation cost-based filtering of one or more potential intermediate points of interest along a route to a primary destination.

Referring now to FIG. 5, a flow diagram of an illustrative method 500 for providing deviation cost-based filtering of one or more potential intermediate points of interest along a route to a primary destination is shown. The method begins at OPERATION 505 and proceeds to OPERATION 510 where user preference data is received. As should be appreciated, it may not be required for user preference data to be input by a user for each use, but may be entered during device set-up or prior to or during travel. According to an embodiment, user preference data may be entered and stored locally on a navigation device 215, 220, 225, 230, 235, may be entered locally and stored remotely in a cost based navigation server database 275 and accessed via a network 240, or may be entered remotely on a network-connected computing device, stored remotely in a cost based navigation server database 275, and accessed by a navigation device via a network 240. As described above, user preference data may include input or selections made by a user specifying one or more preferences a user may have associated with an intermediate POI and/or travel to an intermediate POI.

According to one embodiment, user preference data may be directed to a specific type of intermediate POI. For example, a user may specify a preference for a certain brand of bank. When a search is initiated by the user for a bank, preference may be given to the brand of bank specified by the user.

According to another embodiment, user preference data may be directed to travel preferences. For example, a user may specify a preference for minimizing fuel consumption when deviating from a planned route 302 to an intermediate POI. When a search is initiated by the user for a particular intermediate POI, preference may be given to intermediate POIs meeting the search criteria and wherein the route to the intermediate POI has fewer traffic lights, less traffic congestion, lower speed limits, etc.

According to another embodiment, usage data may be gathered, and user preference data may be automatically extracted from usage data. For example, data associated with searches and/or selections of certain types of POIs (e.g., brand of fuel station or restaurant), selections of routes with common attributes (e.g., routes to POIs that minimize additional travel distances), etc., may be collected, stored, and utilized to present relevant search results to a user.

According to one embodiment, user preference data may include a list of one or more favorite POIs. Information may be provided to the user detailing a distance away or an estimated time away to a nearest each of the one or more favorite POIs. According to another embodiment, map points of one or more favorite POIs may be automatically populated on a map interface 330.

After user preference data is received or extracted, the method 500 proceeds to OPERATION 515 where a route 302 is generated between a specified starting point 305 or current location and a primary destination 325. The generated route 302 may be determined by a navigation system. As described above, the navigation system may comprise a GPS or other position-determining mechanism, and a cost based navigation server 270 and database 275 operable to store and provide maps, POI data, etc. The system may also be operable to receive real-time data, such as traffic information, road construction information, etc. The generated route 302 may be displayed to a user on a map interface 330 of the navigation device 215, 220, 225, 230, 235, and/or step-by-step directions may be provided visually or audibly.

The method 500 proceeds to OPERATION 520, where search criteria for one or more intermediate POIs are received. As illustrated in FIGS. 3B, 3C, and 3D, a search field 304 or a selectable functionality button may be provided on a navigation device for receiving search criteria. For example, and as illustrated, a user searching for a restaurant may enter "RESTAURANT" in a search field 304 to search for restaurants in a given location. Other search criteria may be received, for example, a specific intermediate POI (e.g., SHELL fuel station or MCDONALDS restaurant, etc.), a search for an intermediate POI in a certain radius, within a certain distance, along the generated route 302, etc. According to one embodiment, one or more areas on a map interface may be selected within which to search for specific or any intermediate POIs. For example, a user may touch on an area of a touch screen map interface, and a bubble or radius may be created. A user may also specify search criteria, such as "GAS," to locate gas stations within the bubble or radius. As should be appreciated, search criteria may be received via other methods such as via speech input.

At OPERATION 525, one or more intermediate POIs may be identified based on the received search criteria. For example, if a user searches for a restaurant within a 20 mile radius along a generated route 302, restaurants within the 20 mile radius and along the generated route 302 may be identified.

The method 500 proceeds to OPERATION 530, where data associated with each of the one or more identified intermediate POIs is retrieved. Data may include, but is not limited to, travel distance to each POI, estimated travel time to each POI, traffic information, road class information, road construction information, traffic flow information (e.g., number of left-hand versus right-hand turns, number of traffic lights or stops, etc.) along a route to each POI, POI name, POI contact information, POI address, type of each POI, brand of each POI, features of each POI (e.g., fast-food vs. sit-down restaurant, pet-friendly POIs, POI with a play area, POIs serving alcoholic beverages, etc.), etc.

According to one embodiment, once data associated with each of the one or more identified intermediate POIs is retrieved, the method 500 proceeds to OPERATION 532, where one or more possible alternative routes 430 to the primary destination 325 are identified. At OPERATION 538, a cost associated with a deviation to each of the one or more identified intermediate POIs along the one or more possible alternative routes 430 may be calculated.

According to another embodiment, alternative routes may not be considered. After data associated with each of the one or more identified intermediate POIs is retrieved at OPERATION 530, the method 500 may proceed to OPERATION 535 where a cost associated with a deviation from the generated route 302 to each of the one or more identified intermediate POIs is calculated. According to embodiments, a route deviation cost 340 may be calculated, the route deviation cost factoring in cost penalties according to user preference data. Additionally, a total cost 345 may also be calculated. As described above, a total cost may be derived by taking the distance from a starting point 305 or current location to the deviation point (i.e., the point at which traveling to an intermediate POI would require deviating from the existing route 302), and adding that distance to a calculated route deviation cost 340.

After a cost to each of the one or more identified intermediate POIs is calculated at OPERATION 535 or OPERATION 538, the method 500 proceeds to OPERATION 540, where identified intermediate POIs may be filtered. According to embodiments, the identified intermediate POIs may be filtered according to a calculated route deviation cost 340. According to one embodiment, intermediate POIs with a route deviation cost 340 equal to or greater than a specified number may be filtered out. For example, referring back to FIG. 3A, the intermediate POI "A" 310 may be filtered out if a specification is made to filter out identified POIs with a route deviation cost 340 greater than or equal to 5.

According to another embodiment, a specified number of identified intermediate POIs may be presented to a user. For example, if is specification is made to provide five intermediate POI search results to a user, the five identified intermediate POIs with the lowest route deviation costs may be presented. Filtering criteria (e.g., specified value of deviation cost to filter out, specified number of intermediate POIs to present, etc.) may be set by a user, or may be a default value.

According to an embodiment, identified intermediate POIs may be filtered according to a weighted filter based on a type or brand of intermediate POI. For example, a user may be willing to deviate no more than one mile for a MCDONALDS, but may be willing to deviate up to three miles for a SUBWAY. As should be appreciated, identified intermediate POIs may be filtered according to a weighted filter based on other criteria as specified by a user.

At OPERATION 545, one or more filtered identified intermediate POIs may be presented to a user. As described above with reference to FIGS. 3B, 3C, and 3D, filtered identified intermediate POIs may be presented in a variety of ways including, but not limited to, displaying POIs on a map interface and providing a listing of POIs with or without route deviation costs and/or total costs.

Once filtered identified intermediate POIs are presented to a user, the user may select one or more of the presented POIs, wherein the established route 302 may be modified to accommodate the new one or more intermediate POIs. The method 500 ends at OPERATION 590.

Figure 6:
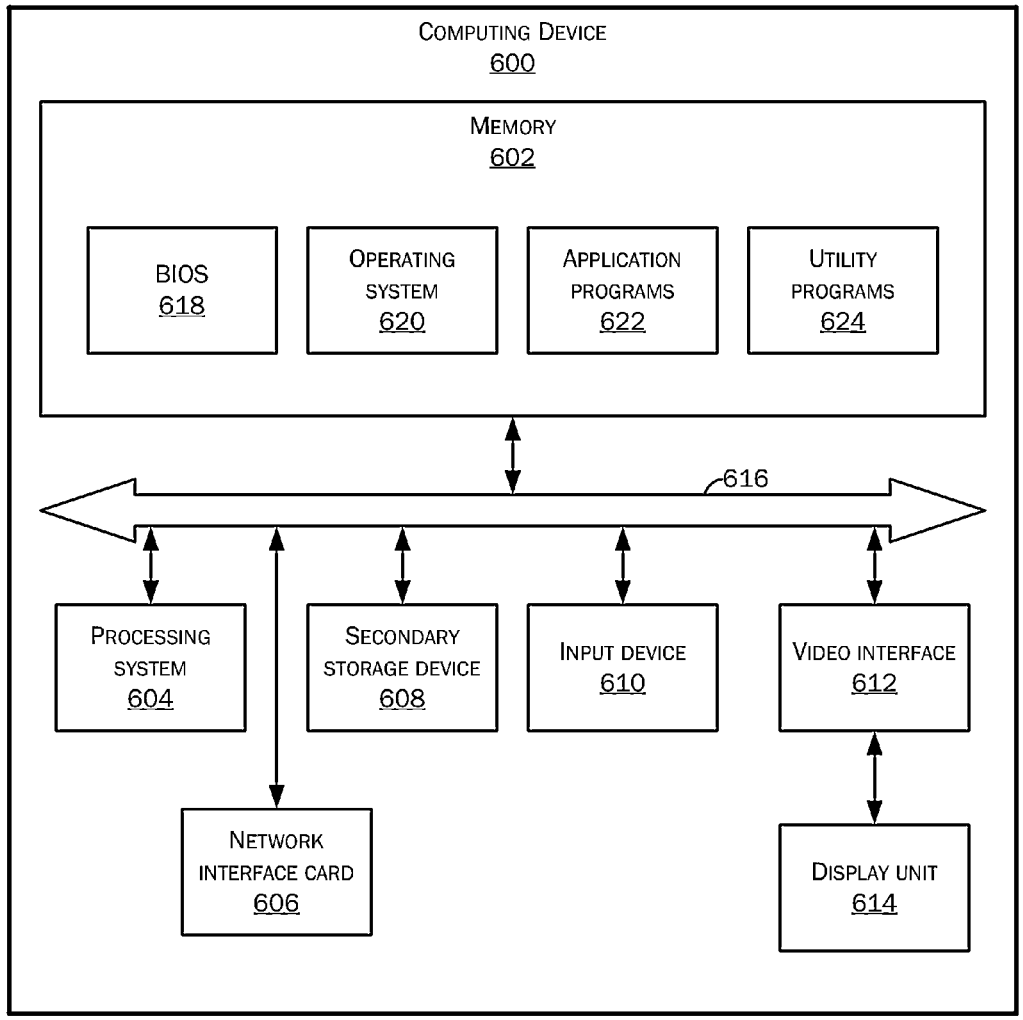
FIG. 6 illustrates example components of a computing device.

FIG. 6 is a block diagram illustrating an example computing device 600 with which embodiments of the present invention may be implemented. In some embodiments, the navigation devices and/or the cost navigation server 270 and database 275 may be implemented using one or more computing devices like the computing device 600. It should be appreciated that in other embodiments, the navigation devices 215, 220, 225, 230, 235, and/or the cost navigation server 270 and database 275 are implemented using computing devices having hardware components other than those illustrated in the example of FIG. 6.

Computing devices are implemented in different ways in different embodiments. For instance, in the example of FIG. 6, the computing device 600 comprises a memory 602, a processing system 604, a network interface 606, a secondary storage device 608, an input device 610, a video interface 612, a display unit 614, and a communication medium 616. In other embodiments, the computing device 600 is implemented using more or fewer hardware components (e.g., a video interface, a display unit, or an input device).

The memory 602 includes one or more computer-readable storage media capable of storing data and/or computer-executable instructions. In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more Intel Core microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., WiFi, WiMax, etc.), or another type of network interface.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be a an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface card 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The memory 602 also stores one or more utility programs 624 that, when executed by the processing system 604, cause the computing device 600 to provide utilities to other software programs.

Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing cost-based navigation, the method comprising:
   receiving user preference data;
   generating a route from a starting point to a primary destination;
   receiving search criteria for one or more intermediate points of interest;
   identifying one or more intermediate points of interest based on the received search criteria;
   retrieving data associated with each of the one or more identified intermediate points of interest;
   calculating a route deviation cost associated with each of the one or more identified intermediate points of interest, each route deviation cost being calculated between one of the identified intermediate points of interest and the route intermediate the starting point and the primary destination;
   calculating a total cost associated with each of the one or more identified intermediate points of interest, each total cost being calculated along the route from the starting point and including the calculated route deviation cost associated with a respective one of the identified intermediate points of interest;
   filtering the one or more identified intermediate points of interest according to at least one of the route deviation costs and the total costs of each of the one or more identified intermediate points of interest;
   presenting the filtered identified intermediate points of interest.

2. The method of claim 1, wherein calculating the route deviation costs factors in user preference data as cost penalties.

3. The method of claim 2, wherein factoring in user preference data as cost penalties includes factoring in data associated with a user's preferences associated with a point of interest including one or more of a brand preference, a feature preference, or a type preference.

4. The method of claim 2, wherein factoring in user preference data as cost penalties includes factoring in data associated with a user's preferences associated with travel to a point of interest including one or more of a user's preference to minimize travel time, to minimize travel distance, or to minimize fuel consumption, a user's road type preference, or a user's traffic flow preference.

5. The method of claim 1, further comprising identifying one or more possible alternative routes to the primary destination.

6. The method of claim 5, further comprising calculating the deviation cost associated with a deviation to each of the one or more identified intermediate points of interest along the one or more identified possible alternative routes to the primary destination.

7. The method of claim 1, wherein receiving user preference data includes receiving preference data input by a user and gleaning preference data from user interaction data.

8. The method of claim 1, wherein retrieving data associated with each of the one or more identified intermediate points of interest includes retrieving travel data to each of the one or more identified intermediate points of interest including one or more of location data, road class information, traffic information, road construction information, traffic flow information, and speed limit information.

9. The method of claim 1, wherein retrieving data associated with each of the one or more identified intermediate points of interest includes retrieving data associated with each of the one or more identified intermediate points of interest including one or more of a name of the point of interest, contact information for the point of interest, a type or classification of the point of interest, a brand of the point of interest, the point of interest's operating hours, and features provided by the point of interest.

10. The method of claim 1, wherein filtering the one or more identified intermediate points of interest further comprises at least one of filtering out points of interest that exceed a specified number of point of interest and filtering out points of interest based on a user's preference for a specified type or brand of point of interest.

11. The method of claim 1, wherein presenting one or more of the filtered identified intermediate points of interest includes displaying the one or more filtered identified intermediate points of interest on a map interface.

12. The method of claim 11, further comprising displaying the calculated cost associated with each of the one or more filtered identified intermediate points of interest.

13. A system for providing cost-based navigation, the system comprising:
a navigation system operable to:
receive user preference data;
generate a route from a starting point to a primary destination;
receive search criteria for one or more intermediate points of interest;
identify one or more intermediate points of interest based on the received search criteria;
retrieve data associated with each of the one or more identified intermediate points of interest;
calculate a route deviation cost associated with each of the one or more identified intermediate points of interest, each route deviation cost being calculated between one of the identified intermediate points of interest and the route intermediate the starting point and the primary destination;
calculating a total cost associated with each of the one or more identified intermediate points of interest, each total cost being calculated along the route from the starting point and including the calculated route deviation cost associated with a respective one of the identified intermediate points of interest;
filter the one or more identified intermediate points of interest according to at least one of the route deviation costs and the total costs of each of the one or more identified intermediate points of interest; and
present one or more of the filtered identified intermediate points of interest.

14. The system of claim 13, wherein the route deviation cost factors in user preference data as cost penalties.

15. The system of claim 14, wherein the navigation system is further operable to factor in user preference data as cost penalties wherein factoring in user preference data as cost penalties includes factoring in data associated with a user's preferences associated with a point of interest including one or more of a brand preference, a feature preference, or a type preference.

16. The system of claim 15, wherein factoring in user preference data as cost penalties includes factoring in data associated with a user's preferences associated with travel to a point of interest including one or more of a user's preference to minimize travel time, to minimize travel distance, or to minimize fuel consumption, a user's road type preference, or a user's traffic flow preference.

17. The system of claim 13, wherein the navigation system is further operable to calculate a cost associated with a deviation to each of the one or more identified intermediate points of interest wherein calculating a cost associated with a deviation to each of the one or more identified intermediate points of interest includes calculating a total cost, the total cost being the sum of a calculated route deviation cost and a distance from a starting point to a deviation point.

18. A tangible non-transitory computer readable medium containing computer executable instructions which when executed by a computer perform a method providing cost-based navigation, comprising:
receiving user preference data;
generating a route from a starting point to a primary destination;
receiving search criteria for one or more intermediate points of interest;
identifying one or more intermediate points of interest based on the received search criteria;
retrieving data associated with each of the one or more identified intermediate points of interest;
calculating a route deviation cost associated with each of the one or more identified intermediate points of interest, each route deviation cost being calculated between one of the identified intermediate points of interest and the route intermediate the starting point and the primary destination;
calculating a total cost associated with each of the one or more identified intermediate points of interest, each total cost being calculated along the route from the starting point and including the calculated route deviation cost associated with a respective one of the identified intermediate points of interest;
filtering the one or more identified intermediate points of interest according to at least one of the route deviation costs and the total costs of each of the one or more identified intermediate points of interest; and
presenting one or more of the filtered identified intermediate points of interest.

19. The tangible non-transitory computer readable medium of claim 18, further comprising identifying one or more possible alternative routes to the primary destination and calculating the deviation cost associated with a deviation to each of the one or more identified intermediate points of interest along the one or more identified possible alternative routes to the primary destination.

20. The method of claim 1, wherein filtering the one or more identified intermediate points of interest comprises not showing one or more of the filtered intermediate points of interest.

\* \* \* \* \*